US012784406B2

(12) United States Patent
Gentric

(10) Patent No.: US 12,784,406 B2
(45) Date of Patent: Nov. 3, 2026

(54) BIOMETRIC RECOGNITION METHOD

(71) Applicant: IDEMIA IDENTITY & SECURITY FRANCE, Courbevoie (FR)

(72) Inventor: Stéphane Gentric, Courbevoie (FR)

(73) Assignee: IDEMIA PUBLIC SECURITY FRANCE, Courbevoie (FR)

(*) Notice: Subject to any disclaimer, the term of this patent is extended or adjusted under 35 U.S.C. 154(b) by 171 days.

(21) Appl. No.: 18/863,496

(22) PCT Filed: Jun. 2, 2023

(86) PCT No.: PCT/EP2023/064883
§ 371 (c)(1),
(2) Date: Nov. 6, 2024

(87) PCT Pub. No.: WO2024/002618
PCT Pub. Date: Jan. 4, 2024

(65) Prior Publication Data

US 2025/0329137 A1 Oct. 23, 2025

(30) Foreign Application Priority Data

Jun. 30, 2022 (FR) ....................................... 2206646

(51) Int. Cl.
*G06V 10/764* (2022.01)
*G06V 10/74* (2022.01)
(Continued)

(52) U.S. Cl.
CPC .......... *G06V 10/764* (2022.01); *G06V 10/761* (2022.01); *G06V 10/7715* (2022.01); *G10L 17/02* (2013.01)

(58) Field of Classification Search
None
See application file for complete search history.

(56) References Cited

U.S. PATENT DOCUMENTS 9,785,823 B2 * 10/2017 Mather .................. G06V 40/12
12,562,002 B2 * 2/2026 Vu ....................... G06V 40/172
(Continued)

OTHER PUBLICATIONS

International Search Report and Written Opinion issued Sep. 4, 2023 in PCT/EP2023/064883 filed on Jun. 2, 2023, 16 pages.
(Continued)

*Primary Examiner* — Talha M Nawaz
(74) *Attorney, Agent, or Firm* — Oblon, McClelland, Maier & Neustadt, L.L.P.

(57) ABSTRACT

A biometric recognition method and device, the method including classifying biometric training data among at least two groups, generating a transition probability density function, classifying a candidate biometric datum among the groups, computing a similarity score for the candidate biometric datum, determining the transition probability density function specific to the group of the candidate biometric datum on the basis of the similarity score computed for the candidate biometric datum, determining a recognition score for the candidate biometric datum, the recognition score resulting from the random draw with the transition probability density function, and deciding to validate or decline the recognition on the basis of the recognition score.

15 Claims, 4 Drawing Sheets

(51) Int. Cl.
*G06V 10/77* (2022.01)
*G10L 17/02* (2013.01)

(56) References Cited

U.S. PATENT DOCUMENTS

| | | | | |
|---|---|---|---|---|
| 2003/0031348 | A1* | 2/2003 | Kuepper | G06F 18/256 382/116 |
| 2017/0206465 | A1* | 7/2017 | Jin | G06F 16/5866 |
| 2024/0054814 | A1* | 2/2024 | Vu | G06V 40/172 |

OTHER PUBLICATIONS

Salvador, T. et al., "FairCal: Fairness Calibration for Face-Verification," Mar. 30, 2022, 30 pages, XP091169330.
Jiang, R. et al., "Wasserstein Fair Classification," Jul. 28, 2019, 15 pages, XP081450601.
Xian, R. et al., "Fair and Optimal Classification via Post-Processing Predictors," Jan. 29, 2023, 45 pages, XP091424528.
Phillips, P. et al., "Face recognition accuracy of forensic examiners, superrecognizers, and face recognition algorithms," PNAS, vol. 115, No. 24, Jun. 12, 2018, pp. 6171-6176, XP093076180.

* cited by examiner

BIOMETRIC RECOGNITION METHOD

CROSS REFERENCE TO RELATED APPLICATIONS

This application is the national stage of PCT Application No. PCT/EP2023/064883, filed Jun. 2, 2023, and claims priority to French Application No. FR2206646, filed Jun. 30, 2022, the disclosure of each of which is incorporated herein by reference in its entirety.

The present invention relates to a biometric recognition method and device. Such recognition methods are used, for example, at the entrances of restricted access sites. A recognition system with one or more biometric capture devices each associated with a gate is arranged, for example, at the entrance of a restricted access site in order for the opening of the gates to be controlled when the recognition is confirmed.

Biometric recognition methods and devices rely on a match between the biometric data of an individual who is a candidate for identification and the biometric data of an individual with authorized access that has been stored in advance. A computer processing unit hosts the database containing the biometric identification data of individuals with authorized access, with this data notably having been acquired by enrolment, and the computer processing unit executes a matching program that compares the biometric data of the candidate individual with the biometric data of individuals with authorized access stored in the memory by means of a matching model. The identification is validated when the biometric data of the candidate individual corresponds to biometric data of one of the individuals with authorized access in the database.

Biometric recognition systems, and notably their matching models, are assessed using tests on validation biometric databases, notably comprising several biometric data samples for the same person, for example several images of the same person with different facial expressions, and the error rates are measured by means of:

- false rejection rates (FRR), which is the proportion of attempts to recognize legitimate users rejected in error, with these rejections by the matching program being explained either due to non-matching in error, or due to a failure in the acquisition when this is applicable;
- false acceptance rates (FAR), which is the proportion of transactions of imposters accepted in error.

The two error rates, FAR and FRR, are linked and depend on a decision threshold that is adjusted as a function of the targeted feature of the high or low security biometric recognition system. Indeed, the lower the decision threshold, the higher the false acceptance rate. In this case, the biometric recognition system will accept imposters. Conversely, the higher the decision threshold, the lower the false acceptance rate. The biometric recognition system will then be resistant to imposters but will reject legitimate users.

When a candidate individual approaches, the matching program, which is known per se, is conventionally executed and it compares the biometric data of the candidate individual with the stored biometric data of individuals with authorized access by means of similarity scores, which then allows the recognition method to confirm or deny the recognition of the candidate individual as one of the authorized individuals. This matching program, when it is executed, computes the similarity score in pairs, between said candidate biometric data item and one, conventionally each, of the stored biometric data items of individuals with authorized access.

Generally, there can be various types of biometric data, which can be extracted from photographs, images, video, 3D images, audio recordings, and characterize the features of the face, fingerprints, the patterns of the irises of the eyes or even the voice, and are generally acquired by optical or audio means connected to a computer processing unit. The biometric learning data is hosted in a learning database that belongs, for example, to the manufacturer of the recognition device or to the operator of the recognition device. The learning database and the validation database of the matching model can be partly, or even completely identical.

Each biometric data item corresponds to a unique individual in the database.

Preferably, several biometric learning data items are stored per individual, for example, in the case of facial recognition, several photographs of the face of the individual, notably at various angles or for various facial expressions. In addition, for the requirements of the learning database, some individuals can be created from any document, and their biometric data is then combined. The biometric learning data can be stored in the form that they assume before extraction, for example a photograph, an image, a video, 3D images, or a sound stream, or can be computationally encoded after extraction, for example, from an image, the facial biometric features are encoded in the form of a biometric vector as described in document FR 3083895, with the extraction of the biometric features per image in the form of a biometric vector being carried out by means of a neural network. This neural network is trained upstream on a biometric learning database whose data is acquired by known dedicated means.

However, a disadvantage of conventional biometric recognition methods mainly lies in their inequitable nature. Indeed, biases have been observed after the matching program has been executed, notably depending on the demographic features of the considered populations and of the relative proportion of each demographic group in the learning database of the neural networks used, making the results between the populations inequitable. This disadvantage is notably encountered for facial recognition, but other biometrics can be involved. These biases are notably expressed by a false rejection rate FRR and a false acceptance rate FAR that are not the same depending on the considered populations.

A method is known that involves determining, for a given similarity score, the score shift value that would allow the false acceptance rates FAR to be aligned between a target group and another group, with this shift value per group then being applied to all the scores of the group; however, this translation alignment solution is a general solution and notably does not allow the histograms of legitimate users to be aligned.

A method is also known that involves making the learning more equitable, however this solution is complex and requires appropriately supplementing the learning database, while only allowing correction of the share of the biases originating from the imbalance in the learning database, but not of the share of the biases linked to specific problems (such as, for women, makeup or any obstruction from hair, for example).

One of the aims of the invention is to overcome at least some of the aforementioned disadvantages by providing a more equitable biometric recognition method.

To this end, the invention provides a biometric recognition method comprising the following steps:

acquiring biometric learning data;

classifying each of said biometric learning data items among at least two groups so as to determine the group to which said biometric learning data item belongs, with said groups notably being mutually exclusive;

establishing a matching model based on said acquired biometric learning data; said recognition method being characterized in that it also comprises the following steps:

generating at least one transition probability density function of at least one of the groups, notably for each group, with the at least one transition probability density function being generated as a function of the biometric learning data of said group;

acquiring a reference biometric data item;

acquiring a candidate biometric data item for biometric recognition;

classifying said candidate biometric data item among said groups so as to determine the group to which said candidate biometric data item belongs:

computing a similarity score for said candidate biometric data item relative to said reference biometric data item using said matching model;

determining the transition probability density function specific to said group of said candidate biometric data item as a function of the similarity score computed for said candidate biometric data item;

determining a recognition score of said candidate biometric data item, with said recognition score resulting from the random draw with said transition probability density function determined for said candidate biometric data item;

deciding to confirm or deny the recognition as a function of the recognition score of said candidate biometric data item by comparing said recognition score with a decision threshold, with said decision threshold notably being independent of the group to which said candidate biometric data item belongs.

Advantageously, the biometric recognition method is thus made more equitable without having to supplement the biometric learning database, i.e., without increasing the generation time of the matching model, since the results of said model in this case are corrected a posteriori. Indeed, the random draw results in the addition of noise, which degrades the performance of the best groups so as to reduce the biases by placing the various groups at the low performance "level", which thus improves the equity between the various groups. The addition of noise is controlled because the random draw is controlled by said probability density function. The use of the matching model for computing the similarity score of the candidate biometric data item is not complexified and is conventionally executed on a reference biometric database, for example, for individuals with authorized access. Furthermore, a transition probability density function is generated for at least the various groups of the target group, but preferably for each of the groups so as to avoid creating diversity at this stage between the target group and the other groups, and the lack of diversity at this stage then allows the recognition score to be determined in a unified manner, indiscriminately for the target group and another group. In addition, the at least one transition probability density function notably corresponds to a field of probability density functions, which then allows discretized processing, notably matrix processing. By virtue of its steps, it is understood that the biometric recognition method according to the invention is computer-implemented, notably by means of at least one computer unit.

Advantageously, the classification of said candidate biometric data item uses information outside said biometric data item as such, such as information extracted from an identity document of the candidate individual. Indeed, the candidate individual, i.e., the individual whose candidate biometric data has been acquired, conventionally has an identity document during enrolment or pre-enrolment, with the information that is taken into account from this document allowing classification among groups, for example, if the groups are gender-related.

Advantageously, establishing the matching model is carried out by training based on said biometric learning data, with the matching model notably comprising a neural network and the training notably being carried out by deep learning data based on said biometric learning data, which allows a reliable matching model to be quickly obtained that is quick to execute once encoded and that requires limited storage memory space.

Advantageously, the biometric recognition method according to the invention comprises the following steps:

computing, for each group, a distribution of the similarity scores of imposters, called initial histogram of the imposters of the group, based on the biometric learning data;

computing, for each group, a distribution of the similarity scores of legitimate users, called initial histogram of the legitimate users of the group, based on the biometric learning data;

which allows equitable performance to be defined between the groups.

Advantageously, for each group, the at least one generated transition probability density function of the group is described in the form of a transition matrix, notably a square matrix, with this discretization of the probability density function at intervals allowing a simple matrix to be used and requiring a limited memory size, and the preference for the square matrix embodies the optimization of this simplification.

Advantageously, the similarity scores and the recognition scores each belong to a continuous range of values extending between a minimum value and a maximum value, with each continuous range of values being divided into a number of score intervals, each transition matrix comprising a number of rows and a number of columns, the number of rows corresponding to said number of recognition score intervals and the number of columns corresponding to the number of similarity score intervals, which allows the matrix to be read with an input data item in the form of a similarity score defining a column and an output data item in the form of a recognition score, without requiring any constraints on the division of intervals of values, which notably do not need to be the same length and in the case whereby the numbers of intervals of similarity and recognition scores are the same then the matrix is a square matrix, of dimension $n^2$, even though the ranges and their divisions could be separate, even if this is not preferred.

Advantageously, during the step of generating at least one transition probability density function of the group, as many transition probability density functions are generated as the number of columns of the transition matrix of said group, which allows a probability density function to be associated with each column of the transition matrix, i.e., for each interval of similarity scores, and allows the probability density function to be discretized by intervals.

Advantageously, the transition matrix of said group is a square matrix and the generating step comprises a sub-step of initializing the transition matrix of said group using the identity matrix, which notably prevents the creation of diversity, depending on the type of group, depending on whether or not it is the target group, during the step of determining the recognition score of the method since, for the target group, with the transition matrix being the unit, the similarity scores of the target group will not be modified during the random draw among the identity matrix. with the recognition score equaling the similarity score. In addition, this initialization also avoids any risk of non-convergence during the generation phase.

Advantageously, the biometric recognition method according to the invention comprises a step of determining a target group, notably from said at least two groups, or by constructing a fictitious target group, which allows a target to be designated so as to cause some or all of the other groups to converge toward this target group.

Advantageously, said target group corresponds to the group for which the accumulation of the initial histogram of the imposters is the highest, which will degrade the performance of the other groups in order to reach that of the target group.

Advantageously, the generating step comprises the following sub-steps:

- defining a cost function for said group, notably where said cost function of said group depends on:
  - variances per column; and
  - a Jensen-Shannon divergence between the initial histogram of the imposters of said group and the initial histogram of the imposters of the target group; and
  - a Jensen-Shannon divergence between the initial histogram of the legitimate users of said group and the initial histogram of the legitimate users of the target group;
- computing the minimum of said cost function of said group by implementing a learning optimization method, notably a gradient descent method or a simulated annealing method or a Levenberg-Marquardt method, so as to determine the at least one transition probability density function of said group. This mode of generating a transition probability density function of a group is equally compatible with the matrix representation in the form of a transition matrix and with any continuous parametric function producing probability density functions. Using the matrix approach, i.e., discretized over intervals, avoids limiting the family of functions that can be generated. In addition, these features allow the probability density functions of the groups to be determined quickly.

Alternatively, the step of generating the transition matrix per group is carried out analytically, and comprises the following sub-steps:

- aligning the initial histogram of the imposters of said group with the initial histogram of the imposters of said target group resulting in an aligned source histogram of the imposters of said group and a modified source histogram of the legitimate users of said group;
- iteratively computing a matrix of possible movements between two indices, forming an index pair, of the transition matrix, with each index designating intervals of similarity and recognition scores of the transition matrix, for all the index pairs, with said matrix of possible movements determining, based on the modified source histogram of the legitimate users of the group, the maximum number of legitimate users movable between said intervals corresponding to said index pairs without the number of imposters changing in the aligned source histogram of the imposters of the group, i.e., by compensating for the moved number of imposters, so as to determine the transition matrix of said group. These features allow the generating step to be implemented in another way and allow local and irregular general minimization, which is of interest in the case of intervals in which the accumulated histograms are very low.

Advantageously, the step of determining a recognition score of said candidate biometric data item is carried out by randomly drawing a number with the probability density function contained in the column corresponding to the score interval comprising the similarity score of said candidate biometric data item, with the number drawn from said column belonging to a recognition score interval corresponding to a row of said column and the recognition score of said candidate biometric data item being defined in the interval of recognition scores corresponding to said row. In the two modes described for the generating step, as a matrix representation, such a step of determining the recognition score simplifies implementation, which essentially requires only knowledge, i.e., the local storage, of the transition matrices of said groups, of a classifier and of the matching model.

Advantageously, in this interval of recognition scores corresponding to said row, the same relative position is used as in the initial interval of scores comprising the similarity score of said candidate biometric data item in order to precisely determine the score thus constructed.

Advantageously, the groups define categories of populations according to demographic and/or social factors, which allows the biometric recognition methods to be equitable irrespective of the gender, or even the trade.

Advantageously, the biometric learning data and/or reference data and/or candidate data is extracted from facial images or from images of fingerprints or from images of veins or from images of irises or from voice recordings, which allows the method to be applied to the various types of biometric data.

Furthermore, a further aim of the invention is a biometric recognition device adapted to implement the biometric recognition method according to the invention, exhibiting the same advantages as the invention.

Further features and advantages of the invention will become apparent upon reading the following description of particular non-limiting embodiments of the invention.

FIG. 1 is a schematic view of part of the method according to the invention;

FIG. 2 schematically shows another part of the method according to the invention;

For the sake of the clarification of the description, and in a non-limiting manner, the case illustrated herein relates to a facial recognition method. The reference DBR and candidate DBC biometric data is extracted from facial images.

A candidate biometric data item DBC for biometric recognition is acquired, in this case it is a photograph of the face of the candidate individual, i.e., a facial image, and this candidate biometric data item DBC notably can be acquired by an optical means such as a camera or a photographic appliance. Preferably, this data item is acquired on site, but it also can be acquired beforehand by means of an application on a mobile telephone, for example. The candidate biometric data item DBC then can be encoded, in the form of a vector, for example.

The candidate biometric data item DBC, which is potentially encoded, is classified among several groups during a classification step E_CLA, in this case, for example, G1 and G2, so as to determine the group to which the candidate biometric data item DBC belongs; in this case it is the first group G1. The groups are preferably mutually exclusive, but they also may not be and in this usage case for a given candidate data item the probability of belonging to each group is estimated, a recognition score is determined for each group and weighted with said probabilities of belonging to each group, so as to produce a consolidated recognition score.

The groups are notably determined as a function of biases that have been observed when validating the matching model and they preferably define categories of populations according to demographic and/or social factors. It can involve, for example, the gender if a bias has been detected, during validation tests. for example, i.e., a difference between the distributions of the similarity scores, or between the false rejection rates FRR and/or false acceptance rates FAR, in women and men.

For example, in this case, the group G1 corresponds to the female gender group and the group G2 corresponds to the male gender group.

Figure 1:
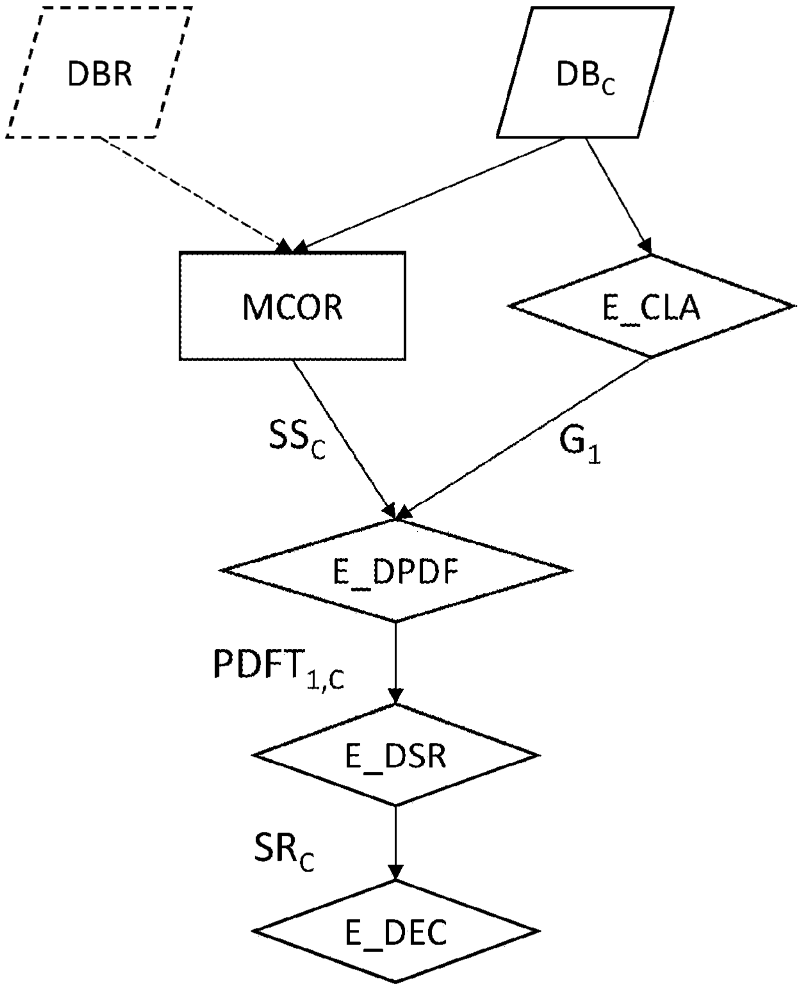
FIG. 1 shows a partial schematic view of the biometric recognition method in the form of a flowchart. The purpose of the disclosed part of the method in FIG. 1 is to more specifically illustrate the steps that are carried out when checking access by means of biometric recognition, for example in order to enter a restricted site.

The means for carrying out this classification step, namely the classifier, can assume different forms. For example, the classifier executes a method for processing the candidate biometric data item in the form of a facial image, for example, by means of a neural network, and/or the classifier executes a document analysis method, if an identity document is also provided in addition, and indicates, or means that it is possible to deduce, affiliation with one of said groups G1, G2. In FIG. 1, the candidate biometric data item DBC has thus been classified among the group G1 that corresponds to the female gender.

For the sake of clarity, the case of a comparison of two biometric data items is illustrated in this case, with one data item being the reference data item DBR of a given individual and the other data item being a candidate individual data item DBC, commonly called "1:1" (1 to 1) verification, but the iteration of the same comparison steps with a plurality of biometric data items of authorized individuals DBR, commonly called "1:n" (1 to many) identification, is conventional practice for a person skilled in the art.

At the same time as the classification step, or consecutively, the acquired candidate biometric data item DBC is transmitted to a matching model MCOR previously established based on biometric learning data. During operation, the matching model MCOR is conventionally executed by comparing the candidate biometric data item DBC with one or more reference biometric data items DBR, for example "1:n" for individuals with authorized access or "1:1" for a specific person. This reference biometric database DBR that is used during operation conventionally is the property of the operator of the recognition device for "1:n" identification or of the specific person for "1:1" verification. The biometric learning database used when establishing the matching model MCOR is preferably different from the reference biometric database DBR, which is stored and is used during operation during 1:n identification recognition, especially since their use does not occur at the same time and does not address the same requirement. Some biometric data nevertheless can exist in the two databases. Indeed, the larger the learning database used for establishing the matching model MCOR (including integrating combined facial images), the better the quality of the matching model, whereas conventionally the reference database of authorized individuals used during operation during recognition only comprises the enrolled biometric data of the individuals with authorized access and evolves over time depending on any new enrolled individuals with authorized access.

Thus, in the case of "1:n" identification, the step of computing the similarity score SSC using the matching model MCOR is repeated on the various reference biometric data items DBR of the reference database formed by the biometric data of individuals with authorized access that is obtained by enrolment, for example. Preferably, all the reference data is compared with the candidate data item DBC given that the computation times are very short and therefore require no particular preselection. Then, preferably, the remainder of the method is applied to each similarity score that is obtained until the recognition score is determined and it is the best recognition score that is obtained from among the compared biometric data that is retained, and that is compared with the decision threshold.

The transmission of the reference biometric data item DBR to the matching model MCOR is shown in the form of dashed lines because the reference biometric data item DBR is previously acquired upstream.

A similarity score SSC is then computed for said candidate biometric data item DBC by means of the previously established matching model MCOR. Such matching models MCOR are known.

Depending on the group G1 in which said candidate biometric data item DBC has been classified and on the previously computed similarity score SSC, the transition probability density function PDFT1,C specific to said group G1 is determined for said candidate biometric data item DBC during a determination step E_DPDF. As described herein, the group that is used for determining E_DPDF the transition probability density function is that of the candidate data item. However, at the same time there can be a step of classifying the reference biometric data item and, if the group resulting from the step E_CLA of classifying the candidate data item differs from the group resulting from the step of classifying the reference biometric data item DBR, which is common in "1:n" identification since the candidate data item is then tested against all or some of the reference biometric database, several variants are applicable, for example using only the group of one of the two (of the reference data item or of the candidate data item), or randomly selecting one of the two groups (of the reference data item or of the candidate data item), or carrying out the step E_DPDF of determining the transition probability density function for each of the two groups twice (of the reference data item or of the candidate data item) and determining the mean of the recognition scores obtained during the step E_DSR of determining a recognition score so as to obtain a consolidated recognition score.

The next step involves determining E_DSR a recognition score SRC of said candidate biometric data item, with said recognition score SRC resulting from the random draw with said transition probability density function PDFT1,C determined for said candidate biometric data item DBC.

Finally, the decision step E_DEC is shown for confirming or denying the recognition, as a function of the recognition score SRC of said candidate biometric data item by comparing said recognition score SRC with a decision threshold t independent of the group GC to which said candidate biometric data item DBC belongs, thus $$E\_DEC(SR_C) = \begin{cases} 1 \text{ if } SR_C \geq \tau \\ 0 \text{ otherwise} \end{cases},$$

with τ being the decision threshold from which the two compared biometric data items are considered to be identical. The decision threshold r is preferably unique, independent of the group to which said candidate biometric data item belongs, but decision thresholds per group also could be contemplated.

Figure 2:
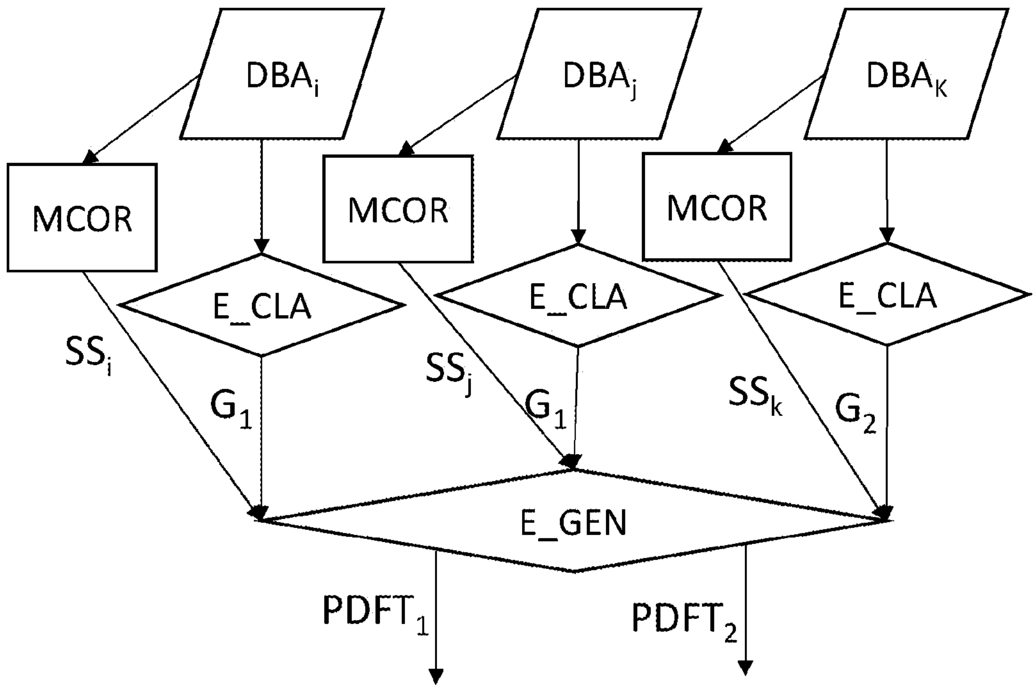

FIG. 2 schematically shows another part of the method according to the invention, and more specifically the steps leading to the generation of at least one transition probability density function; these steps are therefore carried out upstream of the steps previously illustrated in FIG. 1.

A step of acquiring biometric learning data DBAi, DBAj, DBAk is carried out; in this case it involves biometric learning data that will notably be used to establish the matching model MCOR.

A classification step E_CLA is carried out for each biometric learning data item DBAi, DBAj, DBAk so as to determine, from among at least the two groups G1, G2, with group G1 in this case corresponding to the female gender group and group G2 corresponding to the male gender group, the group, namely G1, G2, to which each biometric learning data item DBAi, DBAj, DBAk belongs. These are the same groups as mentioned in the description of FIG. 1; nevertheless, the means for carrying out this classification step, namely the classifier, is not necessarily the same as previously. Preferably, the classifier used in this case executes a method for processing facial images, for example, by means of a neural network. Furthermore, as for the description of the classifier used for the candidate data, it is possible to generalize to groups that are not mutually exclusive, even if this is more complex during learning because this requires learning with weightings per group, which extends the training time.

The matching model MCOR is the essential module encoded in the executable matching program. The step of establishing the matching model MCOR is carried out by training based on said biometric data DBAi, DBAj, DBAk, with the matching model notably comprising a neural network and the training notably being carried out by deep learning based on said biometric learning data DBAi, DBAj, DBAk.

After the step of establishing the matching model MCOR, the step E_GEN of generating at least one transition probability density function PDFT1, PDFT2 of at least one of the groups G1, G2 is carried out, but preferably for each group so as to limit the diversity of the steps of the process depending on whether or not the group is a target group, as shown in this case, so as to reduce the diversity of the branches of the method. The transition probability density functions PDFT1, PDFT2 are then generated as a function of all the biometric learning data DBAi, DBAj, DBAk of each group G1, G2. These transition probability density functions PDFT1, PDFT2 each comprise several probability density functions per interval of scores and constitute fields of probability density functions.

Figure 3:
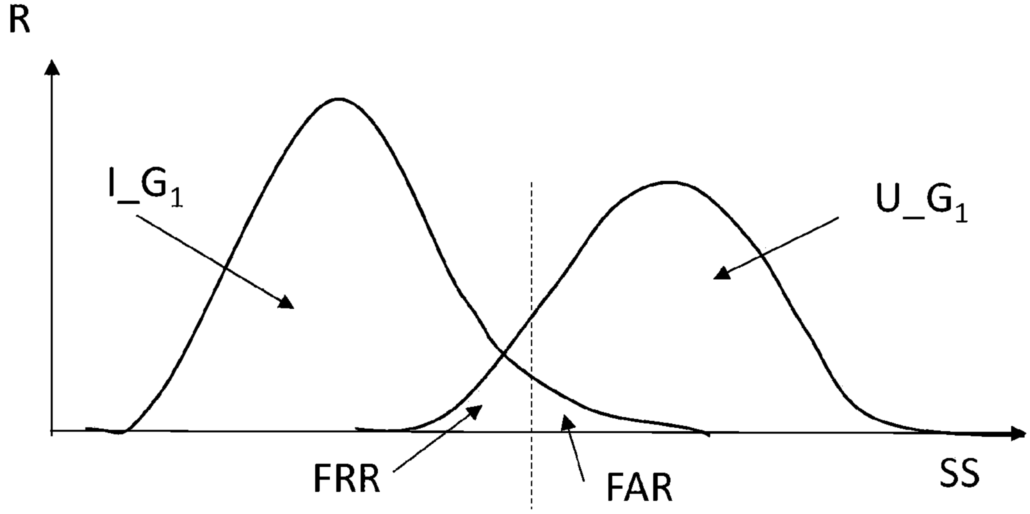
FIG. 3 illustrates distributions of similarity scores of imposters and of legitimate users of a group based on the biometric learning data of said group according to the invention.

FIG. 3 illustrates, for the first group G1, the distributions of the similarity scores of the imposters I_G1 and of the legitimate users U_G1 based on the biometric learning data DBAi, DBAj, DBAk of said group G1 according to the invention. The abscissa represents the similarity scores SS and the ordinate represents the probability density R, the integral of which is 1. An example of a threshold score that determines the two intermediate error rates FAR and FRR is placed on the dashed line. This is an intermediate error rate in this case, if they need to be named, since the distributions shown in this case are shown as a function of the similarity scores and not as a function of the recognition scores SR. At this intermediate stage, if a decision had to be taken based on this threshold, the accepted cases would be to the right of this threshold and the rejected cases would be to the left, hence the conventionally used terms of legitimate users and imposters.

Prior to the generating step E_GEN, or preferably during the generating step E_GEN, the following steps are carried out:

- computing, for each group G1, G2, a distribution of the similarity scores of the imposters, called initial histogram of the imposters I_G1, I_G2 of the group, based on the biometric learning data DBAi, DBAj, DBAk;
- computing, for each group G1, G2, a distribution of the similarity scores of the legitimate users, called initial histogram of the legitimate users U_G1, U_G2 of the group, based on the biometric learning data DBAi, DBAj, DBAk.

Indeed, the random variables are conventionally defined by a probability distribution as well as by distribution parameters, such as the mean and the variance. The probability density fx(x) of a continuous random variable characterizes the probability that an event of X lies in an extremely small interval [x, x+dx], such that:

$$f_X(x) = p[x < X < x + dx] \quad \text{[Math 1]}$$

The distribution function FX(x) describes the probability that the continuous random variable assumes a value that is less than or equal to x. It thus defines the area under the probability density to the left of x, such that:

$$F_X(x) = P[X \leq x] = \int_{-\infty}^{x} f_X(z)|dz \quad \text{[Math 2]}$$

with the total area under fx(x) always being equal to 1, such that:

$$\int_{-\infty}^{+\infty} f_X(x)dx = 1$$

Thus, preferably, the generating step E_GEN generates a transition matrix per group G1, G2, and for each group G1, G2 the field of transition probability density functions PDFT1, PDFT2 is described in the form of a square transition matrix.

Indeed, with reference to FIG. 3, the similarity scores SS belong to a continuous range of values extending between a minimum value, for example 0, and a maximum value, for example 20,000, with said continuous range of values being divided into pieces as a number of score intervals; these intervals cover the entire range and continuously link, without any overlap. The selection of the number of intervals stems from a compromise between the precision and the computation time.

These intervals are not necessarily the same length. Each square transition matrix assumes a dimension of $n^2$, with n corresponding to said number of similarity score intervals as well as to the number of recognition score intervals, since it will be read with a similarity score as input and will output a recognition score. Preferably, the transition matrices of the various groups assume the same dimensions so as to limit the diversity of processing.

Thus, during the step E_GEN of generating at least one transition probability density function PDFT1, PDFT2 of the group G1, G2 as a function of the biometric learning data DBAi, DBAj, DBAk of said group G1, G2, the number of transition probability density functions generated corresponds to the dimensions n of the square transition matrix of said group G1, G2.

Preferably, the step of generating the transition matrix PDFT1, PDFT2 per group comprises a sub-step of initializing said transition matrix PDFT1, PDFT2 of said group G1, G2 using the identity matrix; this step by nature is before any other step affecting the transition matrix PDFT1, PDFT2 of each group. Preferably, the step E_GEN of generating the transition matrix PDFT1, PDFT2 per group comprises a sub-step of determining a target group G1, G2, knowing that this sub-step also could be before the generating step E_GEN.

In this case, the selected target group is the group for which the area under the characteristic probability density of the distribution of the similarity scores of the imposters, i.e., the accumulation of the initial histogram of the imposters I_G1, I_G2, is the highest, i.e., the group with the worst performance, with it being assumed in this case that this target group is the second group G2.

In this case, the target group is selected from said at least two groups G1, G2, but it also can be a fictitious target group constructed on the basis of these groups, by being one or the other as a function of the score so as to plot a fictitious group, which would notably represent the worst performances (accumulation of the highest imposters), which allows a target to be provided toward which it is always possible to correct, and therefore to converge toward, since it is always the worst.

Figure 5:
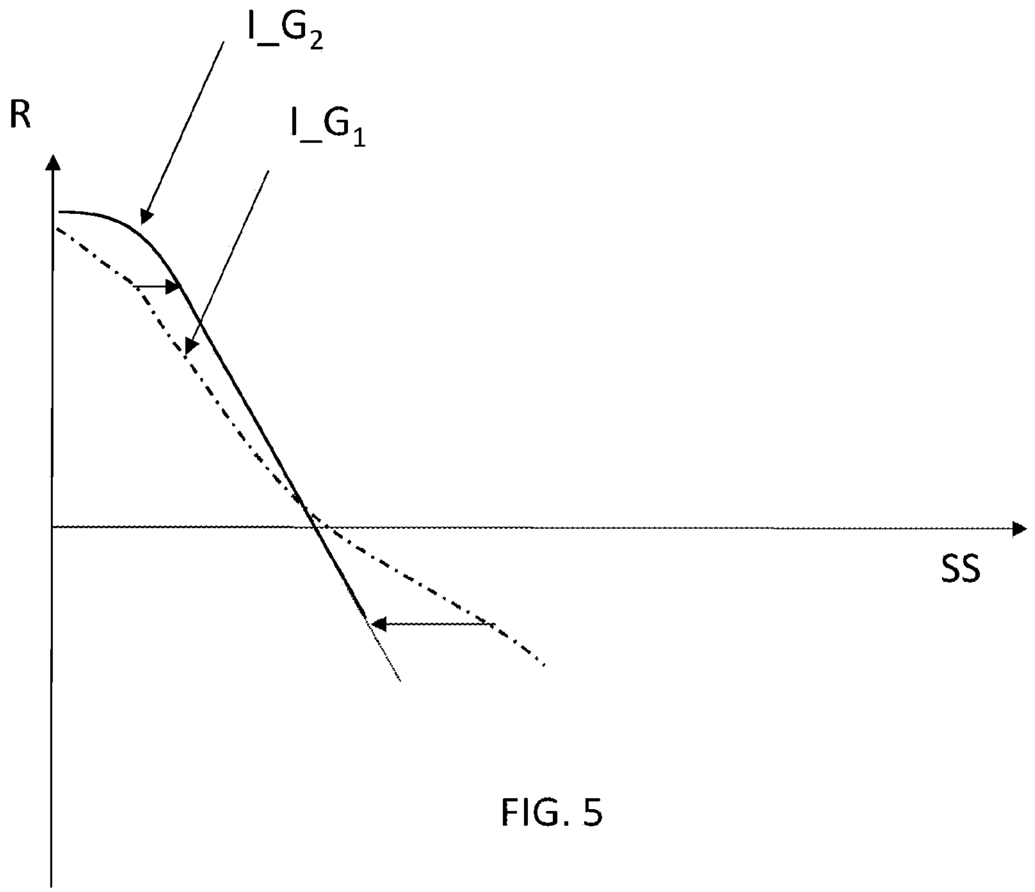
FIG. 5 illustrates the alignment step according to another embodiment of the method according to the invention.

The plot for such a fictitious group therefore would be, for example:

for the FARs (histograms computed by accumulating the histogram of the impostor scores from the largest to the smallest value), a row made up of points of the I_G1 FARs or of the I_G2 FARs depending on which is the highest for each Similarity Score (SS); this fictitious group in some way would be represented by the upper envelope of the FARs of FIG. 5, which allows a fictitious group to be created that always has the worst performances;

for the FRRs, likewise based on the scores of the legitimate users (histograms computed by accumulating the histogram of the legitimate scores from the smallest to the largest value), and therefore toward which it will always be possible to converge, with this fictitious group (defined by its FARs and its FRRs) then being defined as the target group. Another variant could also involve determining a fictitious or non-fictitious target group, which would not be the worst (accumulative, or everywhere), but would be one of the worst so as to find a compromise between the performance and the equitable character of the recognition method. In a particular embodiment, the generating step E_GEN is carried out by learning and comprises, notably after determining the target group from among said at least two groups G1, G2 and initializing the transition matrix PDFT1, PDFT2 of each group, the following sub-steps:

defining a cost function for said group, notably where said cost function of said group depends on:

variances $\sigma_i$ per column; and a Jensen-Shannon divergence JSI, G1, GT between the initial histogram of the imposters of said group G1 and the initial histogram of the imposters of the target group GT (=G2), knowing that the Jensen-Shannon divergence between the initial histogram of the imposters of the target group and the initial histogram of the imposters of the target group by definition is zero (in this case JSI, G2, GT=0 because GT=G2), which avoids requiring any processing diversity between the target group and the other groups; and a Jensen-Shannon divergence JSU, G1, GT between the initial histogram of the legitimate users of said group G1 and the initial histogram of the legitimate users of the target group GT (=G2). The preferred choice of the Jensen-Shannon divergence compared with the K-L divergence is derived from its symmetrical nature; in this case, the cost function is therefore expressed as:

$$F_{cost} = \sum\left(JS_{I,G_1,G_T} + JS_{U,G_1,G_T} + \sum_{i=1}^{n}\sigma_i\right); \quad \text{[Math. 5]}$$

$$\text{i.e., } F_{cost} = JS_{I,G_1,G_T} + JS_{U,G_1,G_T} + \sum_{i=1}^{n}\sigma_i$$

computing the minimum of said cost function of said group by implementing a learning optimization method, notably a gradient descent method. The procedure therefore will involve, per group, minimizing $n^2$ parameters in a known manner so as to obtain the optimized transition matrix PDFT1, PDFT2 comprising n probability density functions each defined by n parameters, since they are defined over n intervals, which allows the $n^2$ values of the transition matrix PDFT1, PDFT2 to be defined. Methods other than the gradient descent method can be used, such as a simulated annealing method or a Levenberg-Marquardt method, so as to determine the transition probability density function of said group. Other optimization methods such as CMAES (Covariance Matrix Adaptation Evolution Strategy) also could be applied.

Constraints inherent to the nature of the transition matrices PDFT1, PDFT2 apply to optimization by learning, thus the values in the transition matrices are positive and the sum of the values of each column of each transition matrix PDFT1, PDFT2 equals 1.

After optimization, the transition matrices PDFT1, PDFT2 of each group G1, G2 are stored in memory spaces of the recognition system computer that will execute the recognition program when verifying the candidate individual. The reference biometric data item DBR is also stored, notably momentarily so as to cover the time of the control operation for "1:1" application, in memory spaces of this recognition system computer. This recognition program comprises the following in sub-modules:

- the matching model MCOR encoded in the form of an executable matching program; as well as
- the classifier of the candidate biometric data item encoded in the form of an executable classification program;
- a corrector encoded in the form of an executable correction program described hereafter;
- a decision model implementing the previously described decision step E_DEC and encoded in the form of an executable correction program;

and can contain a biometric data acquisition model if the recognition system comprises a single computer, but preferably this model is remote and is located in the computer of the sub-system for acquiring candidate biometric data.

Figure 4:
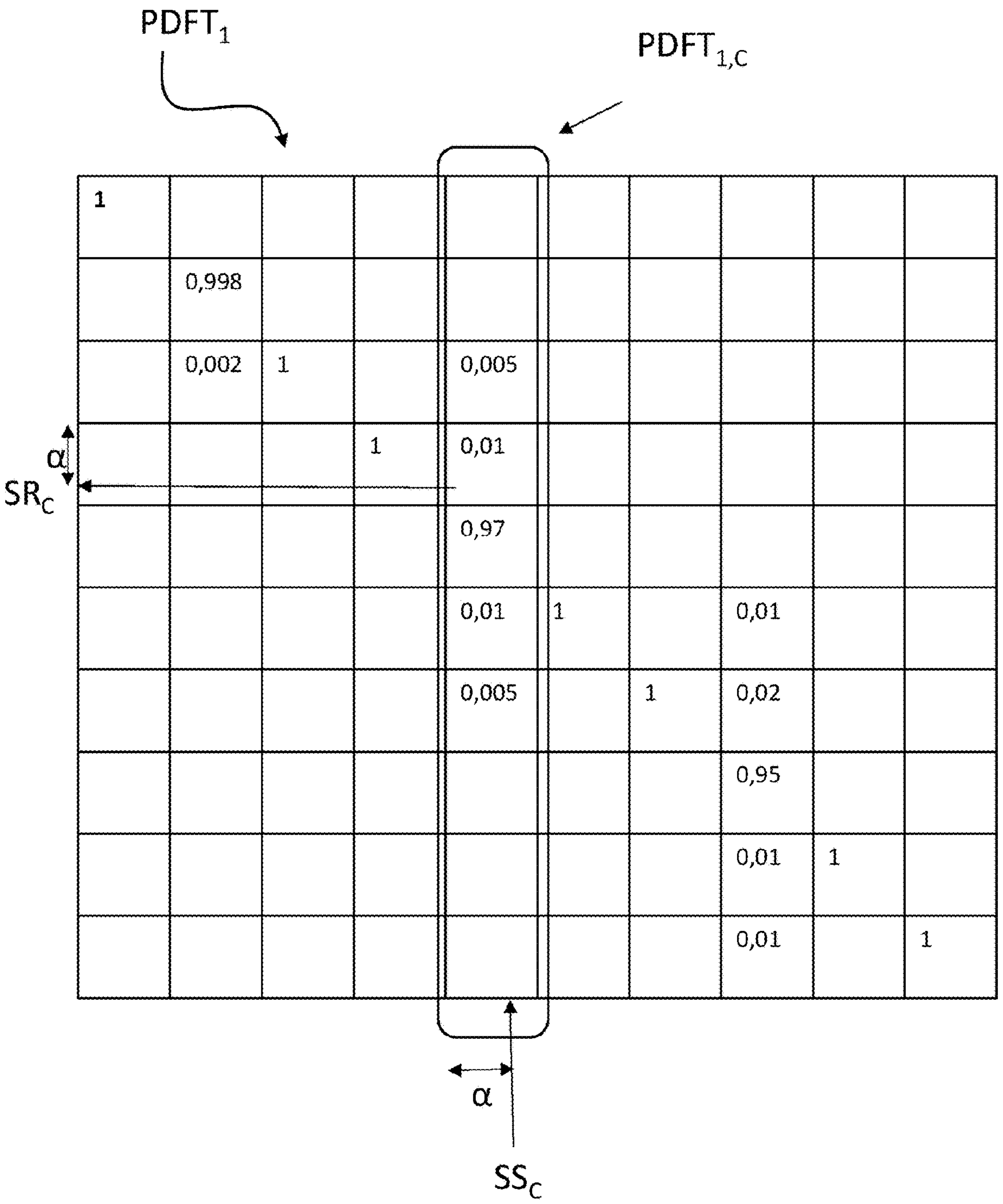
FIG. 4 shows the steps of determining the transition probability density function and of determining a recognition score for said candidate biometric data item according to one embodiment of the method according to the invention.

[FIG. 4] As illustrated in FIG. 4, the corrector executes the following steps in a combined manner:

- determining E_DPDF the transition probability density function PDFT1 specific to said group G1 of said candidate biometric data item DBC as a function of the similarity score SSC computed for said candidate biometric data item DBC: in this case, this involves the selection of the transition probability density, i.e., in this case, the selection of the transition probability density matrix PDFT1 from among the transition probability density functions PDFT1 and PDFT2 of the various groups G1, G2 as a function of the group G1 of the candidate biometric data item DBC, and, from among this transition matrix PDFT1 of said group of the candidate biometric data item, this involves the selection of the probability density function PDFT1,C that corresponds to the similarity score SSC computed for said candidate biometric data item DBC, i.e., to the transition probability density function PDFT1,C expressed in the column corresponding to the interval of the similarity score SS to which the similarity score SSC computed for said candidate biometric data DBC belongs;
- determining E_DSR a recognition score SRC of said candidate biometric data item, with said recognition score SRC resulting from the random draw with said transition probability density function PDFT1,C determined for said candidate biometric data item.

Thus, with reference to the example of FIG. 4, it is clearly apparent that these two steps act together with a view to determining the recognition score SRc. With intervals of similarity scores SS on the abscissa and intervals of recognition scores SR on the ordinate of 2,000, it can be seen that, with a similarity score SSC of 9,500 for the candidate biometric data item DBC, this similarity score SSC belongs to the fifth column of the transition probability density matrix PDFT1 corresponding to the first group G1 to which the candidate biometric data item DBC belongs. Furthermore, the similarity score SSC of the candidate biometric data item DBC is located at a distance $\alpha$ from the lower edge of this fifth interval, in this case equal to 1,500. The step of determining the recognition score SRc is carried out by randomly drawing a number according to the probability density function contained in the column corresponding to the interval of scores comprising the similarity score SSC of said candidate biometric data item, with the number drawn from said column belonging to a recognition score interval corresponding to a row of said column and the recognition score SRc of said candidate biometric data item being defined in the score interval corresponding to said row. With further reference to the example of FIG. 4, this results in drawing from this fifth column, representing PDFT1,C, with said transition probability density function PDFT1,C. which yields a drawn value, which can be likened to an intermediate score, and that in this case will be considered to be equal to 13,000; this drawn value therefore belongs to row 4. The recognition score SRc therefore belongs to the interval of recognition scores SR corresponding to the fourth row of the matrix PDFT1: 6,000-8,000, and more specifically a recognition score SRc is obtained by applying the same distance shift $\alpha$ relative to the lower edge of this fourth interval, which yields a recognition score SRc of 7,500. This choice of applying the same shift at the input and at the output is not necessary but ensures continuity.

Therefore, for the input of the transition matrix PDFT1, the corrector takes the similarity score SSC of the candidate biometric data item DBC and as output provides the recognition score SRc of the candidate biometric data item DBC.

Figure 6:
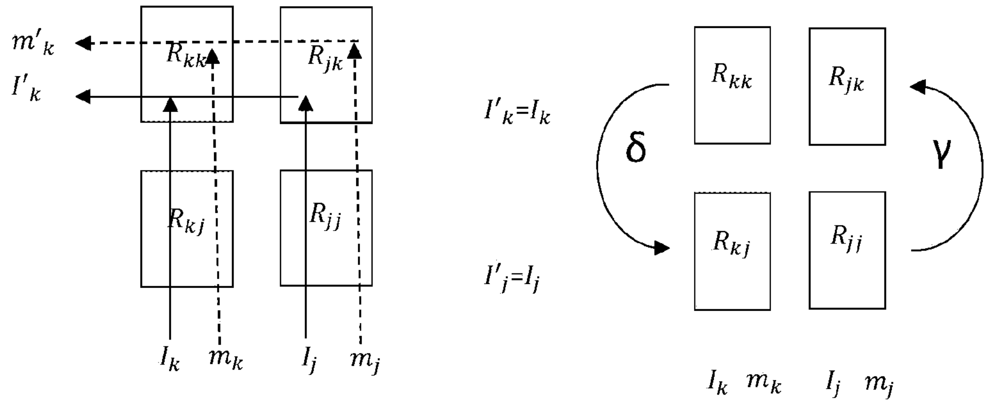
FIG. 6 illustrates the step of iterative computation of a matrix of possible movements between two indices of the transition matrix.

[FIG. 5] According to another embodiment, the step of generating the transition matrix per group PDFT1 and PDFT2 is carried out analytically, as illustrated in FIGS. 5 and 6, and comprises the following sub-steps:

- aligning the initial histogram of the imposters I_G1 of said group with the initial histogram of the imposters I_G2 of said target group, resulting in an aligned source histogram of the imposters and a modified source histogram of the legitimate users:
- iteratively computing a matrix of possible movements between two indices (row and column binomial) of the transition matrix for all the index pairs, with said matrix of possible movements determining, based on the modified source histogram of the legitimate users, the maximum number of legitimate users movable from one index of the pair to the other index of the pair without the number of imposters changing in the aligned source histogram of the imposters, i.e., by compensating for the moved number of imposters, so as to determine the transition matrix of said group.

Constraints inherent to the nature of the transition matrices PDFT1, PDFT2 apply to the generating step that is carried out analytically, thus the values in the transition matrices are positive and the sum of the values of each column of each transition matrix PDFT1, PDFT2 equals 1.

As illustrated in FIG. 5, the alignment step starts from the initial histogram of the imposters I_G1 of the first group G1 (non-target) as dot-and-dashed lines and from the initial histogram of the imposters I_G2 of the target group G2 as a solid line; the histograms in this case are displayed on a logarithmic scale and the initial histogram of the imposters I_G1 of the first group G1 (non-target) is extended if necessary (thinner solid line) in order to cover the same distribution range R, and the arrows represent the shifts in deviations of similarity scores to be applied in order to align the two histograms with one another. These same shifts are also applied to the histograms of the legitimate users U_G1 because the histograms are linked together by nature. Thus, the purpose of the shift is to dynamically align the false acceptance rates FAR of the non-target groups with that of the target group (for example: 1% (R)=+2500 (SS)) and to obtain an aligned source histogram of the imposters and a modified source histogram of the legitimate users. Indeed, the result of the applied alignment is a modification of all the scores, including the scores of the legitimate users and of the imposters, and therefore a modification of their respective histogram.

FIG. 6 illustrates the step of iterative computation of a matrix M of possible movements between two indices j, k of the transition matrix PDFT1 of the first group G1 (non-target), forming an index pair, with each index designating intervals of similarity and recognition scores of the transition matrix; each index therefore corresponds to a row (recognition score) and to a column (similarity score). For all the index pairs j, k, said matrix M of possible movements determines, based on the modified source histogram of the legitimate users, the maximum number of legitimate users movable between said intervals corresponding to said index pairs, without the number of imposters changing in the aligned source histogram of the imposters, i.e., by compensating for the moved number of imposters, so as to determine the transition matrix of said group.

In FIG. 6, the values of the transition matrix PDFT1 are expressed in the form of Rjj, Rjk, Rkj, Rkk, and in this case I refers to a proportion of imposters within the respective interval k, j of the learning database and m refers to a proportion of legitimate users within the respective interval k, j of the learning database. This involves iteratively computing the transition matrix PDFT1 by individual movements that leave the aligned source histogram of the imposters of the first group G1 (non-target) unchanged, in its translation matrix, while aiming at the maximum false rejection rate FRR for the legitimate users. To this end, the transition matrix PDFT1 of the first group G1 (non-target) is initialized for the identity matrix, as in the previous embodiment, and a matrix M of movements is iteratively computed by index pairs γ, δ of the transition matrix PDFT1; this matrix M of movements determines the maximum portion m'k of the distribution of legitimate users post-alignment that can be transferred to another box of the transition matrix PDFT1 without the imposter portion changing: I'k=Ik and I'j=Ij, i.e., by compensating for the moved imposter portion. By considering γ to be the percentage of legitimate users moved from the index j to the index k of the transition matrix PDFT1, setting the aligned source histogram of the imposters of the first group G1 (non-target) means that I'k=Ik and I'j=Ij, which requires returning a portion of δ of the index k to the index j. The possible movements are computed accordingly, then an iterative process moves the portions of legitimate users so as to reach the target false rejection rate FRR. The black solid line arrows illustrate the fact that the imposters are computed based on imposters and the black dashed line arrows illustrate the fact that the legitimate users are computed based on legitimate users, but that in both cases the same transition matrix PDFT1 of values Rjj, Rjk, Rkj, Rkk is used. For each of these iterations p, with the matrix Mp of current possible movements thus being computed, it is possible to modify PDFT1,j and PDFT1,k by the maximum value Mp,j,k, with p being the iteration, i, j being the coordinates in the matrix, so as to approach m'k to its target, without changing I'k. Since PDFT1 was modified during iteration p, Mp+1 is completely recomputed during the next iteration.

Preferably, the indices corresponding to a corner of the transition matrix PDFT1 are the starting point, and more specifically at one end of the diagonal identity of the transition matrix PDFT1 as initialized. Once the matrix has been obtained, the correction step will be applied as before, as is the decision step E_DEC. The advantage of this variant lies in its minimization into localities, unlike the general minimization carried out by the cost function of the embodiment described above. Indeed, over some intervals, the values of the histogram of the imposters are very high (very low FAR rate) or, according to the defined optimization criteria, a convergence is still desired as long as they are not equal to those of the target group, whereas this is not useful and unnecessarily extends the time of the generating step E_GEN.

In the cited embodiments, only two groups have been used, one target group and the other group, but the method similarly applies to a greater number of groups. Similarly, the description has essentially focused on the case of "1:1" verification, but a person skilled in the art will be able to easily apply it to a "1:n" identification, by looping with the matching model MCOR as many times as are necessary.

The biometric recognition device adapted to implement the biometric recognition method according to the invention comprises:

- at least one biometric data acquisition system DBR, DBC;
- at least one candidate biometric data item classifier DBC from among at least two groups G1, G2, with said groups being mutually exclusive;
- a module for computing a similarity score SS, notably comprising the matching model MCOR;
- a module for generating at least one transition probability density function PDFT1, PDFT2 per group G1, G2 as a function of biometric learning data of said group:
- a module for determining the transition probability density function of the determined group of a candidate biometric data item corresponding to the similarity score computed for said candidate biometric data item DBC;
- a module for determining a recognition score SRc of said candidate biometric data item by applying said determined transition probability density function PDFT1,C to a random value;
- a decision module comprising the decision model confirming or denying the recognition as a function of the recognition score SRc of said candidate biometric data item by comparing said recognition score SRc with a decision threshold t independent of the group to which said candidate biometric data belongs.

This device is preferably divided between different units, for example a first unit is used for the upstream steps, where this first unit comprises a first computer unit, notably a computer, and:

- at least one biometric learning data acquisition system DBAi, DBAj, DBAk, for example acquiring data by means of optical or audio means connected to this first computer processing unit;
- a memory for storing said biometric learning data DBAi, DBAj, DBAk in a biometric learning database, in their acquired or encoded format;
- a classifier for each of said biometric data items DBAi, DBAj, DBAk from among at least two groups G1, G2, with said groups preferably being mutually exclusive;
- a module for computing a similarity score SS, notably comprising the matching model MCOR;
- a module for generating at least one transition probability density function PDFT1, PDFT2 per group G1, G2 as a function of biometric learning data of said group; with it being understood that the various modules, the memory and the classifier are preferably hosted in the first computer unit, but also can be distributed over several computers in order to parallelize the computations, and the memory can be hosted in a remote environment;
- and a second unit on the controlled access site, where this second unit comprises a second computer unit, notably a computer:

at least one system for acquiring candidate biometric data DBC and potentially biometric data of authorized individuals DBR when enrolling with said second unit;

a candidate biometric data item classifier DBC for candidate biometric data from among said at least two groups G1, G2;

a module for computing a similarity score SS, notably comprising the matching model MCOR and the reference biometric database of the authorized individuals DBR;

a storage memory comprising the transition matrices PDFT1, PDFT2 of each group G1, G2;

a module for determining the transition probability density function PDFT1,C of the determined group of a candidate biometric data item corresponding to the similarity score SSC computed for said candidate biometric data item DBC;

a module for determining a recognition score SRc of said candidate biometric data item by applying said determined transition probability density function PDFT1,C to a random value;

a decision module comprising the decision model confirming or denying the recognition as a function of the recognition score SRc of said candidate biometric data item by comparing said recognition score SRc with a decision threshold t independent of the group to which said candidate biometric data belongs;

with it being understood that, as before, the various modules, the memory and the classifier are preferably hosted in the first computer unit, but also can be distributed over several computers in order to parallelize the computations, and the memory can be hosted in a remote environment.

The advantage of the invention notably originates from the random draw that is controlled by said probability density function, which itself is computed in order to degrade the performance of the non-target groups and to obtain lower performance, with this controlled addition of "noise" allowing a reduction in any biases without significantly degrading biometric recognition performance.

The invention claimed is:

1. A biometric recognition method comprising:

acquiring biometric learning data, with each biometric data item corresponding to a unique individual;

classifying each of said biometric learning data among at least two groups so as to determine groups to which said biometric learning data belongs, the groups being mutually exclusive; and establishing a matching model based on said acquired biometric learning data;

wherein the biometric recognition method further comprises:

generating at least one transition probability density function of at least one of the groups, for each group, with the at least one transition probability density function being generated as a function of the biometric learning data of said group;

acquiring a reference biometric data item;

acquiring a candidate biometric data item for biometric recognition;

classifying said candidate biometric data item among said groups so as to determine a group to which said candidate biometric data item belongs;

computing a similarity score for said candidate biometric data item using said matching model;

determining the transition probability density function specific to said group of said candidate biometric data item as a function of the similarity score computed for said candidate biometric data item;

determining a recognition score of said candidate biometric data item, with said recognition score resulting from a random draw with said transition probability density function determined for said candidate biometric data item; and deciding to confirm or deny the recognition as a function of the recognition score of said candidate biometric data item by comparing said recognition score with a decision threshold independent of the group to which said candidate biometric data item belongs.

2. The biometric recognition method according to claim 1, wherein establishing the matching model is carried out by training based on said biometric learning data, with the matching model comprising a neural network and the training being carried out by deep learning based on said biometric learning data.

3. The biometric recognition method according to claim 1, further comprising:

computing, for each group, a distribution of the similarity scores of imposters, called initial histogram of the imposters of the group, based on the biometric learning data; and computing, for each group, a distribution of the similarity scores of legitimate users, called initial histogram of the legitimate users of the group, based on the biometric learning data.

4. The biometric recognition method according to claim 3, wherein, for each group, the at least one generated transition probability density function of the group is described in a form of a transition matrix.

5. The biometric recognition method according to claim 4, wherein the similarity scores and the recognition scores each belong to a continuous range of values extending between a minimum value and a maximum value, with each continuous range of values being divided into a number of score intervals, each transition matrix comprising a number of rows and a number of columns, 1 being the number of rows corresponding to said number of recognition score intervals and the number of columns corresponding to the number of similarity score intervals.

6. The biometric recognition method according to claim 5, wherein during the generating at least one transition probability density function of the group as a function of the biometric learning data of said group, as many transition probability density functions are generated as the number of columns of the transition matrix of said group.

7. The biometric recognition method according to claim 4, wherein the transition matrix of said group is a square matrix and the generating comprises a sub-step of initializing the transition matrix of said group using an identity matrix.

8. The biometric recognition method according to claim 4, further comprising:

determining a target group, from said at least two groups, or by constructing a fictitious target group.

9. The biometric recognition method according to claim 8, wherein said target group corresponds to the group for which accumulation of the initial histogram of the imposters is highest.

10. The biometric recognition method according to claim 8, wherein the generating comprises:

defining a cost function for said group; and computing a minimum of said cost function of said group by implementing a learning optimization method, being a gradient descent method or a simulated annealing method or a Levenberg-Marquardt method, to determine the transition probability density function of said group;

wherein said cost function of said group depends on:

variances per column, a Jensen-Shannon divergence between the initial histogram of the imposters of said group and the initial histogram of the imposters of the target group, and a Jensen-Shannon divergence between the initial histogram of the legitimate users of said group and the initial histogram of the legitimate users of the target group.

11. The biometric recognition method according to claim 8, wherein generating the transition matrix per group comprises:

aligning the initial histogram of the imposters of said group with the initial histogram of the imposters of said target group, resulting in an aligned source histogram of the imposters and a modified source histogram of the legitimate users;

iteratively computing a matrix of possible movements between two indices, forming an index pair, of the transition matrix, with each index designating intervals of similarity and recognition scores of the transition matrix, for all the index pairs, with said matrix of possible movements determining, based on the modified source histogram of the legitimate users, the maximum number of legitimate users movable between said intervals corresponding to said index pairs without a number of imposters changing in the aligned source histogram of the imposters, by compensating for the moved number of imposters, so as to determine the transition matrix of said group.

12. The biometric recognition method according to claim 5, wherein the determining a recognition score of said candidate biometric data item is carried out by randomly drawing a number with the probability density function contained in the column corresponding to the score interval comprising the similarity score of said candidate biometric data item, with the number drawn from said column belonging to a recognition score interval corresponding to a row of said column and the recognition score of said candidate biometric data item being defined in the interval of recognition scores corresponding to said row.

13. The biometric recognition method according to claim 1, wherein the groups define categories of populations as a function of demographic and/or social factors.

14. The biometric recognition method according to claim 1, wherein the biometric learning data and/or candidate data and/or reference data is extracted from the group consisting of facial images, images of fingerprints, images of veins, images of irises and voice recordings.

15. A biometric recognition device, said device being adapted to implement the biometric recognition method as claimed in claim 1.

* * * * *